(12) United States Patent
Lundblad et al.

(10) Patent No.: US 11,558,536 B2
(45) Date of Patent: Jan. 17, 2023

(54) CAMERA DEVICE

(71) Applicant: Axis AB, Lund (SE)

(72) Inventors: Sebastian Lundblad, Lund (SE); Malte Bokvist, Lund (SE); Jöns Danelius, Lund (SE); Johan Sjöbäck, Lund (SE); Fredrik Persson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/017,680

(22) Filed: Sep. 11, 2020

(65) Prior Publication Data

US 2021/0084204 A1 Mar. 18, 2021

(30) Foreign Application Priority Data

Sep. 18, 2019 (EP) .................................... 19198074

(51) Int. Cl.
*H04N 5/225* (2006.01)
*G03B 17/14* (2021.01)

(52) U.S. Cl.
CPC ........... *H04N 5/2254* (2013.01); *G03B 17/14* (2013.01); *H04N 5/2253* (2013.01)

(58) Field of Classification Search
None
See application file for complete search history.

(56) References Cited

U.S. PATENT DOCUMENTS

| | | | |
|---|---|---|---|
| 4,104,649 A | 8/1978 | Tanaka et al. | |
| 4,400,072 A * | 8/1983 | Suzuki ................... | G03B 7/095 396/262 |
| 4,954,092 A * | 9/1990 | Fransson ................ | G03B 17/14 396/529 |
| 5,065,175 A | 11/1991 | Suzuki et al. | |

(Continued)

FOREIGN PATENT DOCUMENTS

| | | | |
|---|---|---|---|
| JP | 2007003341 A | * | 1/2007 |
| JP | 2010117571 A | * | 5/2010 |

(Continued)

OTHER PUBLICATIONS

"Lens Mounts," Retrieved from the Internet URL: https://wiki.apertus.org/index.php/Lens_Mounts, on Mar. 7, 2019, 10 pages.

*Primary Examiner* — Quan Pham
(74) *Attorney, Agent, or Firm* — Xsensus LLP

(57) ABSTRACT

A camera device includes an optics unit and a sensor unit releasably connectable to each other, and an electronic accessory releasably connectable to the optics unit by means of a threaded fitting associated with a rotation axis, wherein the optics unit comprises optics unit connectors, which in an assembled state of the camera device each is aligned and in contact with an associated electronic accessory connector of the electronic accessory thereby forming an electric connection between the electronic accessory and the sensor unit via the optics unit, wherein the optics unit connectors and the associated electronic accessory connectors form a first group consisting of at least one optics unit connector and associ- (Continued)

ated electronic accessory connector arranged for power transfer and a second group consisting of at least one optics unit connector and associated electronic accessory connector arranged for signal transfer.

10 Claims, 3 Drawing Sheets

(56) References Cited

U.S. PATENT DOCUMENTS

| | | | |
|---|---|---|---|
| 2006/0183977 A1* | 8/2006 | Ishigami | A61B 1/0684 |
| | | | 600/179 |
| 2007/0166027 A1* | 7/2007 | Misawa | G03B 17/02 |
| | | | 396/529 |
| 2011/0317062 A1 | 12/2011 | Fujino et al. | |
| 2016/0037050 A1 | 2/2016 | Irie | |
| 2017/0123181 A1* | 5/2017 | Fujisawa | G02B 23/2476 |
| 2018/0107098 A1 | 4/2018 | Ifuku et al. | |
| 2018/0348607 A1 | 12/2018 | Saito | |

FOREIGN PATENT DOCUMENTS

| | | | |
|---|---|---|---|
| JP | 4869645 B2 * | 2/2012 | |
| WO | 2015/114934 A1 | 8/2015 | |
| WO | 2016/053476 A1 | 4/2016 | |
| WO | 2018/056075 A1 | 3/2018 | |

* cited by examiner

CAMERA DEVICE

CROSS-REFERENCE TO RELATED APPLICATION

The present application claims priority to EP 19198074.7, filed Sep. 18, 2019, the entire contents of which are incorporated herein by reference.

FIELD OF THE INVENTION

The invention relates to a camera device. In particular, the invention relates to a camera device comprising an electronic accessory.

BACKGROUND ART

Modular cameras such as network cameras may be used in many different situations, both indoors and outdoors. The versatility of modular cameras has led to an increased demand for cost effective production of modular cameras. To meet this demand, it is desirable to reduce, not only the cost for the components of the modular cameras but also the costs associated with the assembly of modular cameras. It is also desirable to improve the functionalities of this type of cameras.

Further, modular cameras may be used in different environments and for different purposes. To obtain high quality images, accessories may be added to the camera unit of the modular camera, which can increase the bulkiness of the camera unit.

A modular camera normally comprises two separate parts; a camera unit and a main unit connected to the camera unit via a cable.

The camera unit may comprise a sensor unit and an optics unit releasable supported by the sensor unit. An image sensor may be arranged in the sensor unit. The camera unit may be quite small and have a length in the range of 10-50 mm and a diameter in the range of 10-50 mm.

The main unit may be arranged for image processing and network communication and may be placed separately from the sensor unit.

The camera unit of a modular camera thus comprises several components, and the assembly of the camera unit requires a plurality of steps which may be complicated, time consuming, and costly. Furthermore, the assembly requires high precision. Small deviations in the relative position of the components within the camera unit of the modular camera may for example lead to misalignment reducing the performance of the modular camera. Proper alignment of the optics unit in the sensor unit is especially critical as a small deviation may significantly reduce the image quality achieved by the modular camera.

SUMMARY OF THE INVENTION

In view of that stated above, the object of the present invention is to provide a camera device that mitigates at least some of the above discussed issues.

To achieve at least one of the above objects and also other objects that will be evident from the following description, a camera device having the features defined in claim 1 is provided according to the present invention.

Preferred embodiments of the device will be evident from the dependent claims.

More specifically, there is provided according to the present invention a camera device comprising: an optics unit and a sensor unit releasably connectable to each other, and an electronic accessory releasably connectable to the optics unit by means of a threaded fitting associated with a rotation axis. The optics unit comprises optics unit connectors, which in an assembled state of the camera device each is aligned and in contact with an associated electronic accessory connector of the electronic accessory thereby forming an electric connection between the electronic accessory and the sensor unit via the optics unit. The optics unit connectors and the associated electronic accessory connectors form a first group consisting of at least one optics unit connector and associated electronic accessory connector arranged for power transfer and a second group consisting of at least one optics unit connector and associated electronic accessory connector arranged for signal transfer. In the assembled state of the camera device, the first group is arranged at a first radial distance from the rotation axis and the second group is arranged at a second radial distance from the rotation axis, the first distance being different from the second distance. The first radial distance is solely occupied by the first group. The second radial distance is solely occupied by the second group.

An advantage of the provided camera is that accessories may be added to a camera without requiring cables. Thus, a more compact camera arrangement is provided. The provided camera device may comprise different accessories for different purposes. Thus, the available fields of use of the camera may increase. Another advantage with the provided camera is that maintenance of the camera can be made cost-efficient. The electronic accessory can be exchanged in a simple manner and based on need for the situation without any need to change the whole camera arrangement. By the first group of connectors being arranged for power transfer and the second group of connectors being arranged for signal transfer and arranged at a different radial distance, the camera device may be assembled with a reduced risk of short circuiting. Thus, a camera device is provided that enables fail safe assembly. The first group and the second group of connectors being at different radial distances from the rotation axis may eliminate the risk of any short circuiting. The optics unit connectors and the electronic accessory connectors are arranged such as to prevent any connector belonging to the first group of connectors from engaging any connector of the second group of connectors.

The optics unit connectors and associated electronic accessory connectors may be arranged for power transfer or signal transfer between the electronic accessory and the sensor unit.

The electronic accessory may be readily connected to the optics unit without adding bulkiness to the camera device, and the invention is thus particularly suitable for small camera devices such as modular cameras. The threaded fitting may comprise an external thread provided on a protruding section of the optics unit supporting a lens arrangement and a corresponding internal thread provided in a cylindrical body of the electronic accessory. Thus, the electronic accessory may be connected to the optics unit by means of screwing the electronic accessory onto the optics unit. This may facilitate assembly of the camera device.

The electronic accessory may be a non-optical accessory. The non-optical accessory may be an electromagnet, an audio unit, a light unit, a radar unit, or a detector unit. This may be beneficial since the functionality of the camera device may increase. The electromagnet may be used for mounting the camera device on a suitable support structure, such as a steel plate. By adding for example an audio unit, the camera device may capture both video and sound without added bulkiness of the camera device. The audio unit may by way of example be a speaker, or a microphone. By adding a light unit, the camera device may be used in a darker environment. The light unit may by way of example be arranged to emit or receive light. The light unit may be arranged to receive or emit light in the form of visible light, or IR light, or UV light, or laser. By adding a radar unit, the camera device may determine distances to what is present in the captured images. The detector unit may by way of example be arranged to detect smoke or vibration in the field of view of the camera device.

Hence, the advantage is a more versatile camera where functionalities may be added and removed in a simple manner.

The optics unit may comprise a varifocal lens member. Thus, a camera device may be provided having the ability to zoom in and out in a cost-efficient manner while having an added accessory for extended functionality. The varifocal lens member may have a larger field of view than a fixed focus lens, which may be beneficial for monitoring cameras. The varifocal lens member may improve the quality of the captured image of the camera device.

The electronic accessory may comprise an actuator for controlling the varifocal lens member. The actuator may improve the flexibility and ease of use of the camera device. The actuator may be beneficial to use when the camera device is a monitoring camera. The actuator may be arranged to automatically zoom in and out when the camera is active.

At least one of the optics unit connector and the associated electronic accessory connector in at least one pair of optics unit connector and associated electronic accessory connector may have a circumferential extension. This may reduce the risk of the optics unit connector and associated electronic accessory connector being misaligned when the electronic accessory unit is connected to the optics unit. The circumferential extension may provide a camera device having a lens arrangement that is simple to assemble.

At least one of the first and second group may comprise one pair of optics unit connector and associated electronic accessory connector only, in which one pair the optics unit connector or the associated electronic accessory connector may have an annular extension. This may ensure a well-established electric connection between the optics unit and the electronic accessory that is less sensitive to their exact end position relative each other.

Each optics unit connector may be arranged to engage with the sensor unit in response to the optics unit connectors being aligned and in contact with associated electronic accessory connectors. Hereby, the electronic accessory may be electrically coupled to the sensor unit via the optics unit when the electronic accessory is connected to the optics unit.

When the electronic accessory is connected to the optics unit, the electronic accessory may be movable to an end position by means of the threaded fitting, wherein the optics unit connectors are aligned and in contact with the associated electronic accessory connectors when the electronic accessory is arranged in the end position. The electronic accessory may thus be screwed onto the optics unit thereby providing a simple procedure to assemble the camera device with ensured functionality.

The first group may comprise an optics unit connector for grounding and associated electronic accessory connector for grounding.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

A camera device will in the following be described with reference to FIGS. 1A-B, 2, 3A-B, and 4.

Figure 1A:
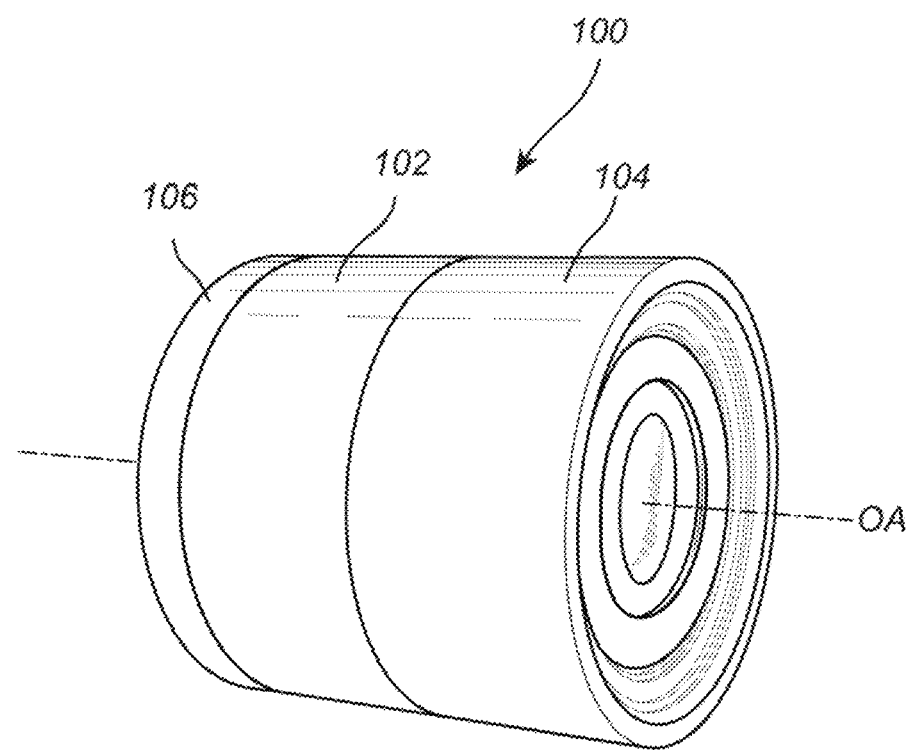
FIG. 1A is a perspective view of a camera device.
Figure 1B:
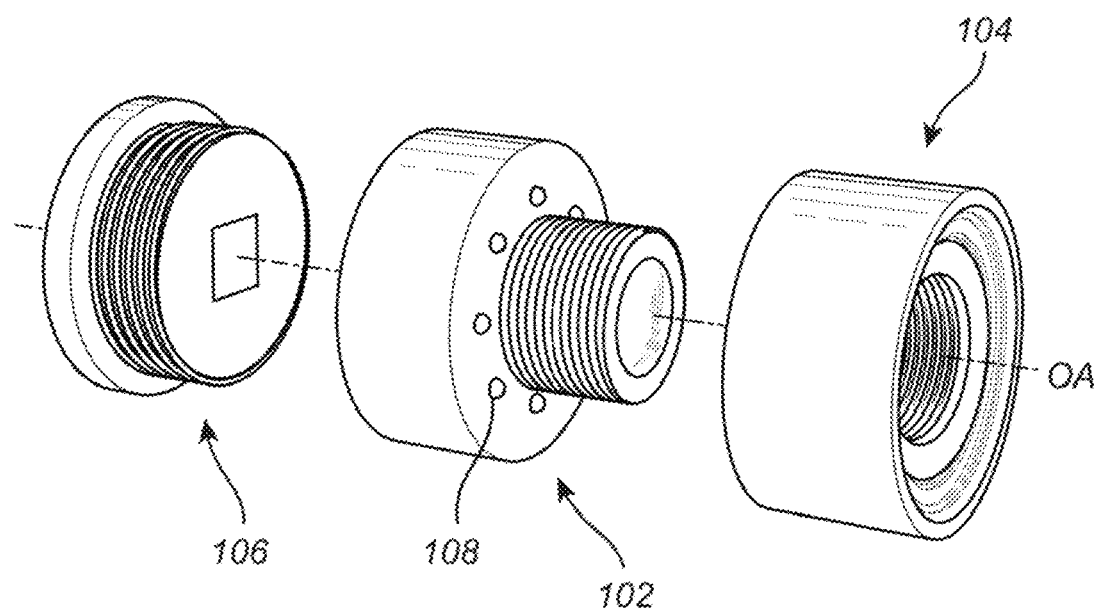
FIG. 1B is an exploded view of the camera device shown in FIG. 1A.

FIG. 1A illustrates a camera device 100 and FIG. 1B illustrates the camera device 100 in an exploded view. The camera device 100 comprises an optics unit 102, a sensor unit 106, and an electronic accessory 104. The camera device 100 has an optical axis OA.

The camera device 100 is a modular camera comprising a processing unit (not illustrated) being connected to the sensor unit 106, for instance via a cable. The optics unit 102, the sensor unit 106, and the electronic accessory 104 may in such a case be formed as one unit being connected to a processing unit.

The camera device 100 may be a fixed focus, or an auto-focus camera. The modular camera may be adapted for surveillance/monitoring purposes.

The optics unit 102 and the sensor unit 106 are releasably connected to each other. Further, the electronic accessory 104 is releasably connected to the optics unit 102 by means of a threaded fitting. The threaded fitting is associated with a rotation axis. The rotation axis may coincide with the optical axis OA of the camera device 100.

In some embodiments, the camera device 100 further comprises a seal (not illustrated). The seal may be arranged between the electronic accessory 104 and the optics unit 102 in order to form an environmental seal in the assembled state of the camera device 100 protecting the electric connection from moist, dust, and the like.

Figure 2:
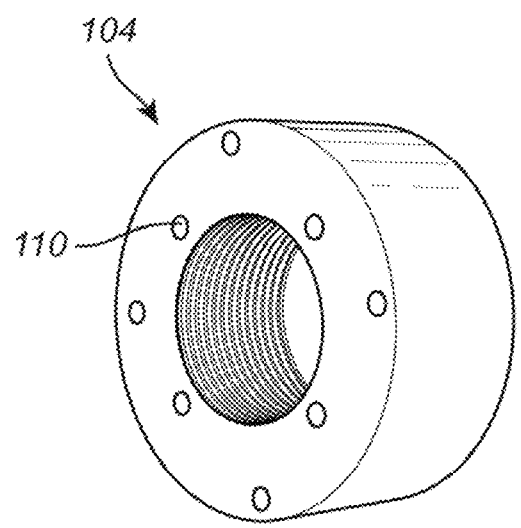
FIG. 2 is a perspective view of an electronic accessory unit of the camera device shown in FIG. 1A.

As is evident from the embodiment of the optics unit 102 shown in FIG. 1B, the optics unit 102 may comprise a protruding section comprising an external threading. The protruding section of the optics unit 102 may be arranged to support a lens arrangement arranged within the section. Correspondingly, the electronic accessory 104 may comprise an internal thread provided in a cylindrical body of the electronic accessory 104, as shown in FIG. 1B and FIG. 2. Thus, the external threading of the optics unit 102 and the internal threading of the electronic accessory 104 may form the threaded fitting for releasably connecting the optics unit 102 with the electronic accessory 104.

The optics unit 102 comprises optics unit connectors 108. The optics unit connectors 108 have associated electronic accessory connectors 110 being comprised in the electronic accessory 104. When the camera device 100 is in an assembled state, each of the optics unit connector 108 is aligned and in contact with an associated electronic accessory connector 110. The alignment is achieved by the threaded fitting.

The optics unit connector 108 may comprise a spring-loaded pin. The spring-loaded pin may by way of example be a pogo pin. The spring-loaded pin may provide the camera device 100 with a compact electric connection to transfer signals or power between the sensor unit 106 and the electronic accessory 104. Thus, the camera device 100 may hold accessories in a compact way that does not need any external or internal cables.

When the electronic accessory 104 is screwed onto the optics unit 102, the spring-loaded pins may be displaced against the action of springs (not shown) such that an electric connection is formed with the sensor unit 106. Spring-loaded pins may further provide the camera device 100 with a reliable electric connection, even in rigorous environments.

Figure 4:
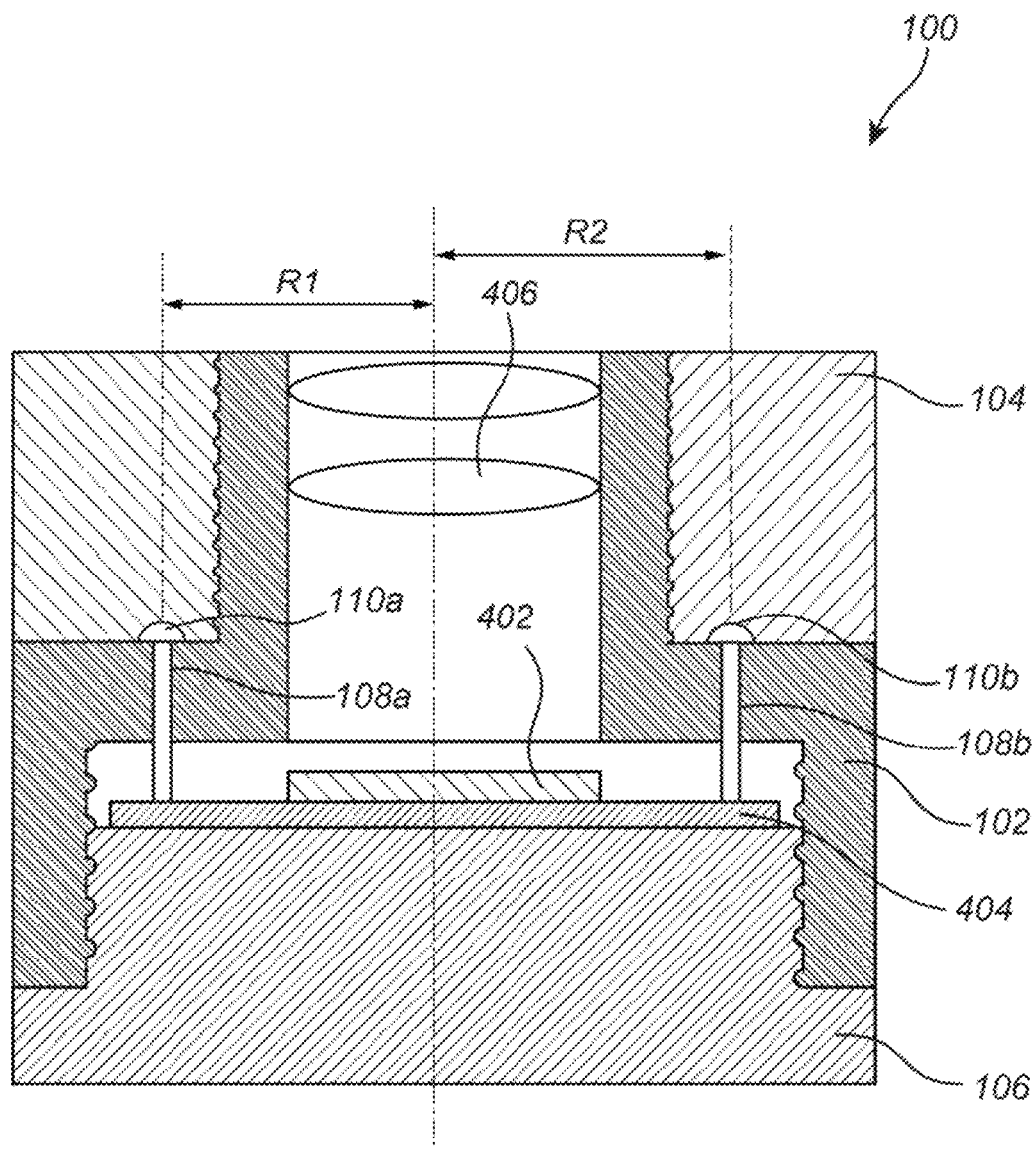
FIG. 4 is a cross sectional view of the camera device shown in FIG. 1A.

By aligning the optics unit connector 108 with the associated electronic accessory connector 110, the electric connection is formed between the electronic accessory 104 and the sensor unit 106 via the optics unit 102, which is shown in detail in FIG. 4 depicting a cross sectional view of the camera device 100. In the shown figure, two electronic accessory connectors 110a, b are each aligned and in contact with two corresponding optics unit connectors 108a, b. The optics unit connectors are of pogo pin type and have in response to the contact with the associated electronic accessory connectors 110 been pressed down such that an opposite end of each pogo pin has been brought to engagement with a contact point of a printed circuit board 404 of the sensor unit 106. Thus, when the pogo pins have engaged the printed circuit board 404, the electric connection between the electronic accessory 110 and the sensor unit 106 is established. The electric connection may transfer signals between the printed circuit board 404 and the electronic accessory, for example audio signals or data pertaining to an image. The contact point of the printed circuit board 404 may be an electric pad for transferring electric signals.

In the shown embodiment, the printed circuit board 404 comprises an image sensor 402 aligned with a lens member 406 of the optics unit 102.

The optics unit connectors 108 and the associated electronic accessory connectors 110 form a first group of connectors 108a, 110a arranged for power transfer. The optics unit connectors 108 and the associated electronic accessory connectors 110 further form a second group of connectors 108b, 110b arranged for signal transfer. The first group 108a, 110a consists of at least one optics unit connector 108 and associated electronic accessory connector 110. The second group 108b, 110b consists of at least one optics unit connector 108 and associated electronic accessory connector 110.

As seen in FIG. 4, in an assembled state of the camera device 100, the first group 108a, 110a is arranged at a first radial distance R1 from the rotation axis and the second group 108b, 110b is arranged at a second radial distance R2 from the rotation axis. The first radial distance R1 is different from the second radial distance R2. The different radial distances R1, R2 are different to reduce the risk of short circuiting the electric connections of the camera device 100. The first radial distance R1 is solely occupied by the first group 108a, 110a. The second radial distance is solely occupied by the second group 108b, 110b.

As described above, the first group of connectors, 108a, 110a may be arranged for power transfer. The connectors of the first group 108a, 110a are arranged at a first radial distance R1 which is different from the second radial distance R2 at which the connectors of the second group 108b, 110b are arranged. Thus, the connectors of the first group 108a, 110a cannot engage the connectors of the second group 108b, 110b during assembly, and thereby the risk of short circuiting is eliminated or at least substantially reduced when the electronic accessory is connected to the optics unit by means of the threaded fitting.

The electronic accessory 104 may be a non-optical accessory. The non-optical accessory may be an electromagnet, an audio unit, a light unit, a radar unit, or a detector unit. The audio unit may be a speaker or a microphone. The audio unit may be arranged to receive or emit sounds. The audio unit may improve the functionality of the camera device 100, and if the camera device 100 is a monitoring camera, it may be beneficial to also record sounds of the environment. When the electronic accessory 104 is a light unit, the camera device 100 may be arranged to be suitable for use in a darker environment. The light unit may be arranged to receive or emit, visible light, IR light, UV light, or laser. The detector unit may be arranged to detect for example smoke or vibrations. A detector unit for detecting smoke may be beneficial since it may send a signal that a fire or other smoke is present in the environment of the camera device 100.

When the electronic accessory unit 102 is an electromagnet, the electromagnet may be arranged for fastening or mounting of the camera device 100.

The electronic accessory 104 may comprise one or more accessories. In such case, signal transfer between the electronic accessory 104 and the optics unit 102 may be configured according to conventional signal techniques. By way of example, the electronic accessory 104 may comprise a speaker and an audio collector. In another example, the electronic accessory 104 may comprise IR unit and a LED unit.

Power to the one or more accessories provided through the electric connection may be supplied by the sensor unit 106. The amount of power is controlled to avoid overheating of the camera device 100.

In some embodiments, the first group may comprise optics unit connector 108 for grounding and associated electronic accessory connector 110 for grounding.

The lens arrangement supported by the optics unit 102 may comprise a varifocal lens member. A varifocal lens member may have different zooming distances and thus, a field of view for the camera may be adjusted. In some embodiments the electronic accessory 104 may comprise an actuator. The actuator may be configured to control the varifocal lens member.

In some embodiments of the camera device, at least one of the optics unit connector and the associated electronic accessory connector in at least one pair of optics unit connector and associated electronic accessory connector has a circumferential extension.

Figure 3A:
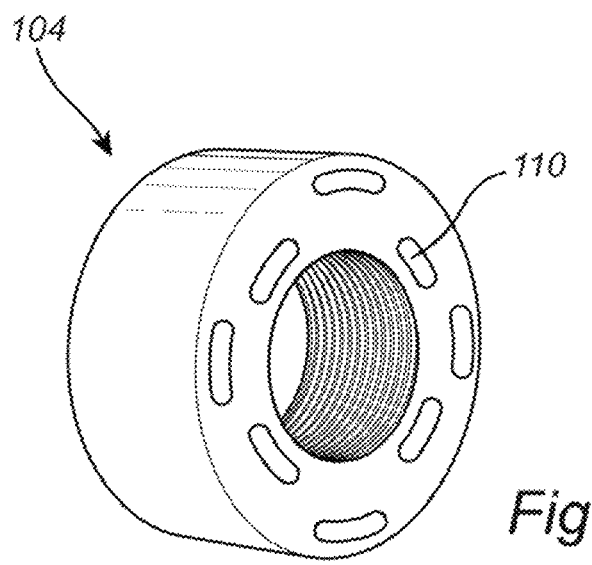
FIG. 3A is a perspective view of an electronic accessory of the camera device shown in FIG. 1A.
Figure 3B:
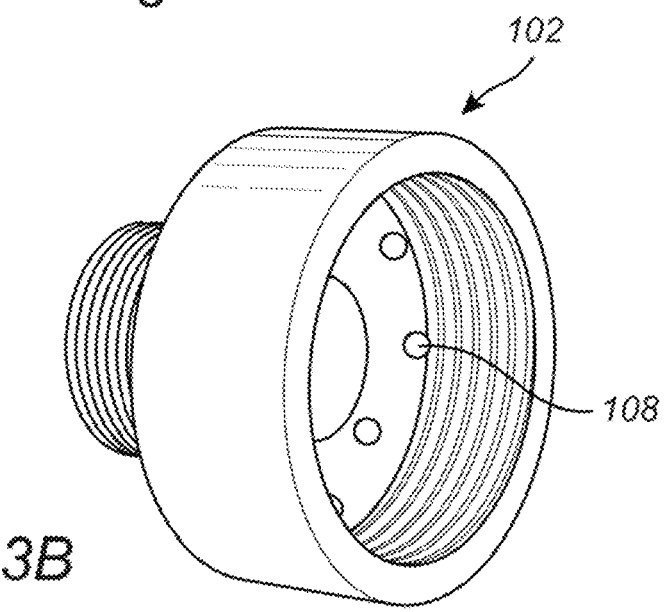
FIG. 3B is a perspective view of an electronic accessory of the camera device shown in FIG. 1A.

FIG. 3A illustrates an embodiment of the electronic accessory 104. In the shown embodiment, the electronic accessory connectors 110 has a circumferential extension. Thus, when the electronic accessory 104 is screwed onto the optics unit, there is there is a lower risk of misaligning the optics unit connector 108 and the respective electronic accessory connector 110. The risk of misalignment is reduced by the circumferential extension providing the camera device 100 with a higher tolerance for positioning of the electronic accessory 104 in relation on the optics unit 102. Advantageously, if there is any wear of the threaded fitting that affects the relative positioning, the optics unit connectors 108 will still make contact with the associated electronic accessory connector 110 when the camera device 100 is assembled.

In some embodiments, the first and/or the second group may comprise only one pair of optics unit connector 108 and associated electronic accessory connector 110. In such an embodiment, the optics unit connector 108 or the associated electronic accessory connector 110 may have an annular extension, thereby further facilitating aligning of the connectors during assembly. This configuration allows a variable positioning of the electronic accessory 104 relative the optics unit 102. With an annular extension of the connector 108/110, connection will be made between the connectors regardless of how the relative position when the electronic accessory 104 and the optics unit 102 are attached to each other.

Other forms of the connectors than the illustrated and/or above discussed are also feasible. Non-limiting examples include semi-annular extension.

The electronic accessory 104 may be movable to an end position by means of the threaded fitting when connected to the optics unit 102. The end position may correspond to a position when the optics unit connectors 108 are aligned and in contact with the respective associated electronic accessory connectors 110. When the electronic accessory 104 has reached the end position, the spring-loaded pin may be arranged to reach full compression.

In some embodiments, the electronic accessory 104 may be movable to a first and second end position, respectively. This is enabled by the threads of the threaded fitting being configured as a conventional double thread. The double thread may be arranged on the optics unit or on the electronic accessory unit. This may allow for the electronic accessory 104 or the optics unit 102 to comprise a pair of connectors for the same type of signal connectors or pair power/ground connectors.

In such case, there are two different electronic accessory connectors 110 that can be connected to the same optics unit connector 108, depending on which entry is used for the fitting. In the example, the two electronic accessory connectors 110 are arranged at a respective first and a respective second end position. The first end position is reached by starting the threading of the electronic accessory 104 in a first thread of the double thread. The second end position is reached by starting the threading of the electronic accessory 104 in a second thread of the double thread. Thus, the electronic accessory 104 may comprise a set of different electronic accessory connectors 110, and the usage of the electronic accessory 104 may be determined based on which thread of the double thread the threading starts in. To facilitate the usage of the double thread, the first and second thread, respectively, may have markings indicating which end positions will be reached by which thread.

When the accessory unit 104 has reached the end position and is electronically connected to the optics unit 102, the optics unit 12 is arranged to engage with the sensor unit 106. Each of the optics unit connectors 108 may be arranged to engage with the sensor unit in response to the optics unit connectors 108 being aligned and in contact with associated electronic accessory connectors 110. By such a connection, the electronic accessory 104 may be electrically connected to the sensor unit 106 by means of a simple assembly without any need for external cables. Consequently, a compact camera device 100 is provided with improved functionality.

It will be appreciated that the present invention is not limited to the embodiments shown. Several modifications and variations are thus conceivable within the scope of the invention which thus is exclusively defined by the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A camera device comprising
an optics unit and a sensor unit releasably connectable to each other a threaded fitting, and
an electronic accessory formed separately from the optics unit and the sensor unit and releasably connectable to the optics unit by means of a threaded fitting associated with a rotation axis,
wherein the sensor unit comprises an image sensor, which in an assembled state of the camera device, is aligned with a lens member of the optics unit,
wherein the optics unit comprises optics unit connectors, Which in an assembled state of the camera device each is aligned and in contact with an associated electronic accessory connector of the electronic accessory thereby forming an electric connection between the electronic accessory and the sensor unit via the optics unit,
wherein the electronic accessory connectors are rotatable about the rotation axis in relation to the optics unit connectors when the electronic accessory is releasably connected to the optics unit by means of the threaded fitting,
wherein the optics unit connectors and the associated electronic accessory connectors form a first group consisting of at least one optics unit connector and associated electronic accessory connector arranged for power transfer and a second group consisting of at least one optics unit connector and associated electronic accessory connector arranged for signal transfer,
wherein, in the assembled state of the camera device, the first group is arranged at a first radial distance from the rotation axis and the second group is arranged at a second radial distance from the rotation axis, the first distance being different from the second distance,
wherein the first radial distance is solely occupied by the first group, and
wherein the second radial distance is solely occupied by the second group.

2. The camera device according to claim 1, in which the threaded fitting comprises an external thread provided on a protruding section of the optics unit supporting a lens arrangement and a corresponding internal thread provided in a cylindrical body of the electronic accessory.

3. The camera device according to claim 1, wherein the electronic accessory is a non-optical accessory in the form of an electromagnet, an audio unit, a light unit, a radar unit, or a detector unit.

4. The camera device according to claim 1, wherein the optics unit comprises a varifocal lens member.

5. The camera device according to claim 4, wherein the electronic accessory comprises an actuator for controlling the varifocal lens member.

6. The camera device according to claim 1, wherein at least one of the optics unit connector and the associated electronic accessory connector in at least one pair of optics unit connector and associated electronic accessory connector has a circumferential extension.

7. The camera device according to claim 1, wherein at least one of the first and second group comprises one pair of optics unit connector and associated electronic accessory connector only, in which one pair the optics unit connector or the associated electronic accessory connector has an annular extension.

8. The camera device according to claim 1, wherein each optics unit connector is arranged to engage with the sensor unit in response to the optics unit connectors being aligned and in contact with associated electronic accessory connectors.

9. The camera device according to claim 1, in which the electronic accessory, when connected to the optics unit, is movable to an end position by means of the threaded fitting, wherein the optics unit connectors are aligned and in contact with the associated electronic accessory connectors when the electronic accessory is arranged in the end position.

10. The camera device according to claim 1, wherein the first group comprises an optics unit connector for grounding and associated electronic accessory connector for grounding.

\* \* \* \* \*